Figure 1:
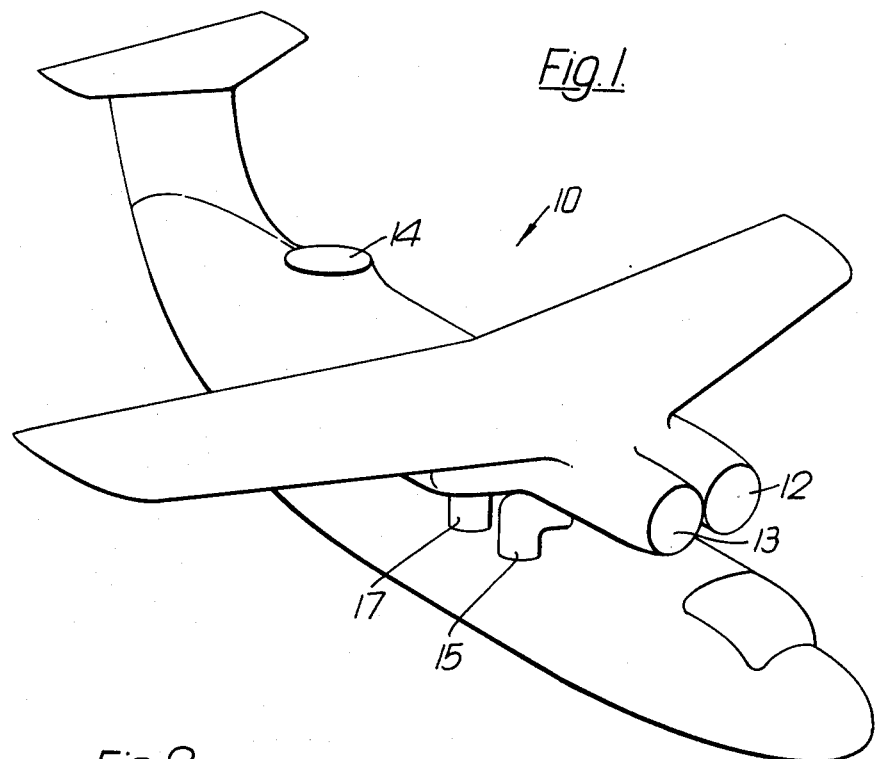

United States Patent [19]

Harvey

[11] 4,171,112

[45] Oct. 16, 1979

[54] V.S.T.O.L. AIRCRAFT WITH CONTROL MEANS FOR MAINTAINING SUBSTANTIALLY EQUAL THRUST ON BOTH SIDES OF THE AIRCRAFT

[75] Inventor: Harry M. Harvey, Allestree, England

[73] Assignee: Rolls-Royce Limited, London, England

[21] Appl. No.: 922,051

[22] Filed: Jul. 5, 1978

[30] Foreign Application Priority Data

Jul. 29, 1977 [GB] United Kingdom ............... 32070/77

[51] Int. Cl.² .................... B64C 15/02; B64C 15/08; B64D 27/14
[52] U.S. Cl. ................................ 244/12.5; 244/52; 244/55
[58] Field of Search ..................... 244/12.5, 12.4, 55, 244/23 D, 52, 58, 56; 340/27 R; 60/224

[56] References Cited

U.S. PATENT DOCUMENTS

| | | | |
|---|---|---|---|
| 3,146,590 | 9/1964 | Erwin | 244/52 |
| 3,611,282 | 10/1971 | Hill | 340/27 R |
| 3,703,266 | 11/1972 | Lincks et al. | 244/55 |

FOREIGN PATENT DOCUMENTS

| | | | |
|---|---|---|---|
| 1756004 | 4/1970 | Fed. Rep. of Germany | 244/12.5 |
| 1444358 | 7/1976 | United Kingdom | 244/55 |

*Primary Examiner*—Barry L. Kelmachter
*Attorney, Agent, or Firm*—Cushman, Darby & Cushman

[57] ABSTRACT

An aircraft has three propulsion engines, two of which each include one pivotable exhaust nozzle which are arranged one on each side of the aircraft, and a third engine including two pivotable exhaust nozzles, one of which is arranged on either side of the aircraft. The arrangements being such that upon failure of one of the two engines the efflux from the third engine is only directed through the nozzle situated on the side of the aircraft which the failed nozzle is arranged.

5 Claims, 4 Drawing Figures

V.S.T.O.L. AIRCRAFT WITH CONTROL MEANS FOR MAINTAINING SUBSTANTIALLY EQUAL THRUST ON BOTH SIDES OF THE AIRCRAFT

This invention relates to aircraft and more particularly to the arrangement of gas turbine engines in such aircraft of the vertical or short take off and land type (V.S.T.O.L.).

Aircraft having the ability to take off vertically or in short horizontal distances are well known in the art. Such aircraft are usually provided with one or more propulsion engines having exhaust nozzles which are pivotable such as to direct the thrust from the, or each engine both vertically for take off, and horizontally for normal forward propulsion. Obviously the nozzles are operable in any position intermediate of the positions previously mentioned to assist in transition to and from vertical and forward movement of the aircraft.

One of the main problems associated with such aircraft is that in the event of an engine failure ocurring in a multi-engine type aircraft, the aircraft will become unbalanced or perhaps even become completely uncontrollable particularly in the vertical take off, landing or hover modes of operation. Previously engine arrangements have been made in an attempt to overcome this problem and these have usually resulted in linking the jet pipes of the engines together such that upon failure of an engine, the remaining engine or engines will continue to provide thrust from all the jet pipe nozzles. Obviously such jet pipe arrangements by virtue of their complexity lead to increased engine weight.

An object of the present invention is to provide an improved arrangement of gas turbine engine for a V.T.O.L. type aircraft.

Accordingly the present invention provides an aircraft having three propulsion engines, two engines each including one pivotable exhaust nozzle each, which nozzles are arranged on opposite sides of the aircraft, the third engine including two pivotable exhaust nozzles one of which is arranged on either side of the aircraft, and including means whereby upon failure of one of the two engines the efflux from the third engine is exhausted through one of its two nozzles arranged on the side of the aircraft carrying the inoperative engine pivotable nozzle.

Preferably the means provided within each of the pivotable nozzles included upon the third engine comprise valve means, and the pivotable nozzles provided upon the two engines are provided with pressure sensors.

Furthermore control means are provided such that the valve means provided within the third engine nozzles are controlled in accordance with pressure monitored by the pressure sensors within the nozzles provided upon the two engines.

Preferably the valve means provided within the third engine nozzles comprise a pivotably mounted flap.

Figure 2:
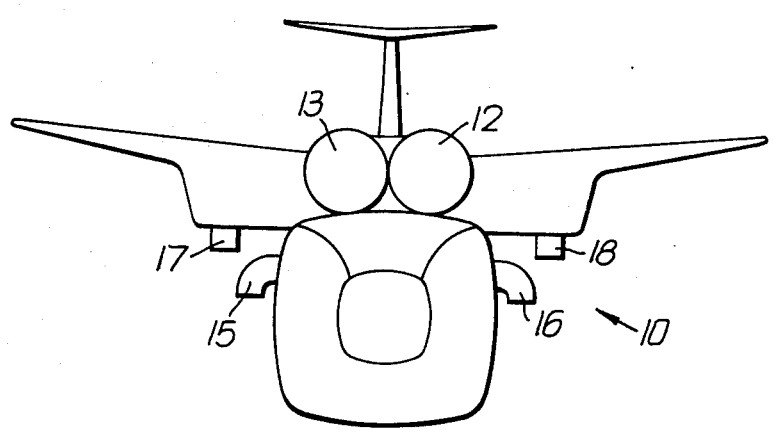
Figure 3:
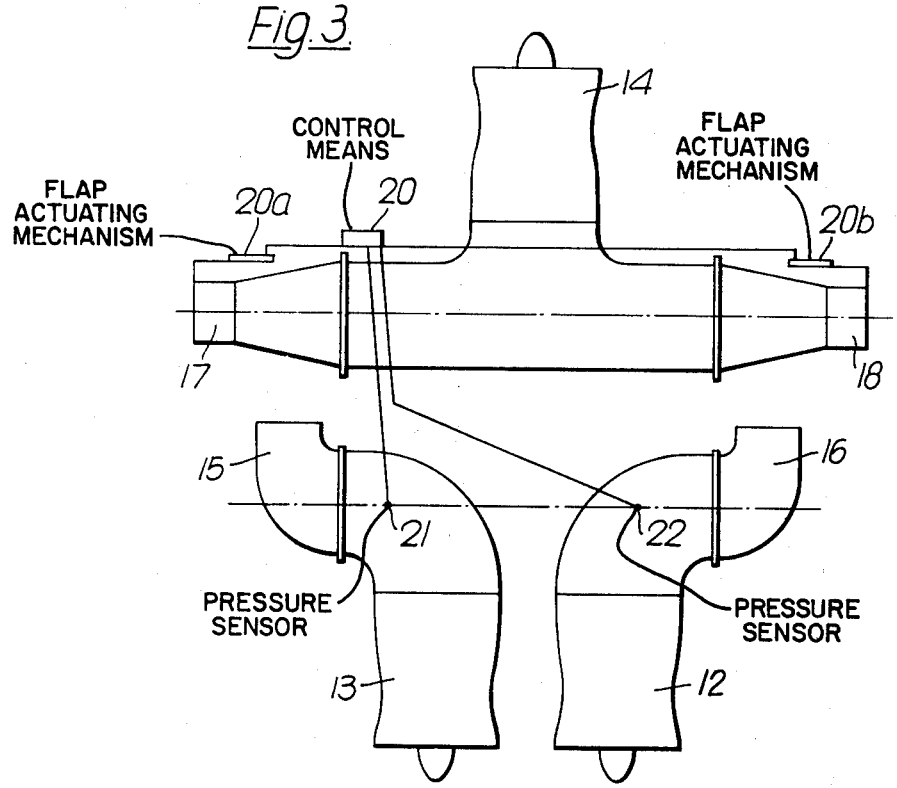
Figure 4:
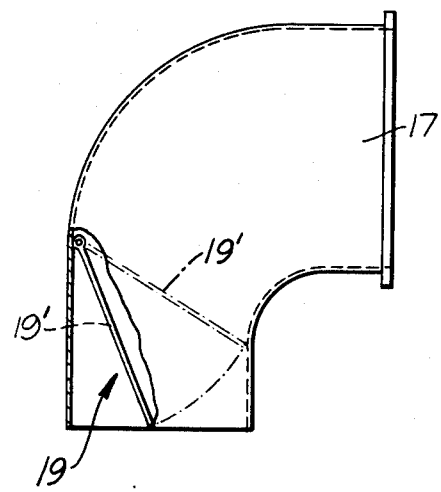

For better understanding of the invention an embodiment thereof will now be more particularly described by way of example only and with reference to the accompanying drawings in which:

FIG. 1 shows a pictorial view of an aircraft including engines arranged in accordance with the present invention, FIG. 2 shows a front elevation of the aircraft shown pictorily at FIG. 1, FIG. 3 shows in plan view a diagrammatic layout of the engines included within the aircraft, FIG. 4 shows a side view of a pivotable engine exhaust nozzle including a valve.

Referring to the drawings an aircraft of the vertical take off and land type (V.T.O.L.) shown generally at 10 includes three gas turbine propulsion engines 12, 13 and 14. The two upstream most engines 12 and 13 are arranged with their axes parallel to each other and each engine terminates in a single pivotable exhaust nozzle 15 and 16, one of which is arranged either side of the aircraft fuselage.

The third gas turbine engine 14 is provided with two pivotably mounted exhaust nozzles 17 and 18 one of which is arranged on either side of the aircraft fuselage. In FIG. 3 of the drawings the centre line of the nozzles 17 and 18 is shown to be downstream of the nozzles 13 and 14, however this is only done for the sake of clarity, in actual fact the true centre line of the nozzles 17 and 18 lies vertically above the centre line of the nozzles 13 and 14. The two nozzles 17 and 18 are each provided with valve means 19 each of which comprises a single pivotable flap 19'. The valve means 19 are actuated by control means generally indicated at 20 through flap actuating mechanisms 20a and 20b which are shown merely schematically in the drawings. The control means 20 operate in accordance with pressure detectors or sensors 21 and 22 which are arranged within portion of the exhaust nozzles 15 and 16 of the two engines 12 and 13.

Each of the gas turbine engines 12, 13 and 14 included in the aircraft may comprise any conventional type of gas turbine engine, for example an engine of the bypass or pure jet type, although obviously the invention is in no way restricted to aircraft including engines only of such types.

For vertical take off or landing of the aircraft, each of the nozzles 15, 16, 17 and 18 are angled vertically downwards and the flaps 19' constituting the valve means 19 within the nozzles 17 and 18 are each maintained in the open position as shown in full lines at FIG. 4. In the event of either a complete engine failure or a partial loss in thrust ocurring on either one of the main engines 12 or 13, a drop in jet pipe pressure in that engine which has failed or partially failed will be detected by the one of the pressure sensors 21 or 22 situated within a portion of the exhaust nozzles 15 or 16 of that particular engine 12 or 13. The control means 20 will therefore actuate one of the flap operating mechanisms 20a or 20b in accordance with the drop of jet pipe pressure to adjust the flap 19 within one of the nozzles 17 or 18 such that a substantially equal thrust will be maintained on both sides of the aircraft.

After take off of the aircraft the nozzles 15 and 16 only, or together with the nozzles 17 and 18 are gradually rotated by means not shown in the drawings to a horizontal position to propel the aircraft in forward flight in which condition the aircraft lift is maintained by its wings. It is considered that for improved fuel economy during forward flight the third engine 14 may be completely shut down, the aircraft being propelled entirely by the gas turbine engines 12 and 13.

I claim:

1. A V.S.T.O.L. comprising:
   two gas turbine propulsion engines, each of which includes a pivotable exhaust nozzle, the pivotable exhaust nozzle of one of said two gas turbine engines being arranged on one side of the aircraft and the pivotable exhaust nozzle of the other of said two gas turbine propulsion engines being arranged on the opposite side of the aircraft;

a third gas turbine propulsion engine including two pivotable exhaust nozzles, one of which is arranged on one side of the aircraft and the other of which is arranged on the opposite side of the aircraft;

and means within each of the pivotable nozzles of said third gas turbine propulsion engine for controlling efflux of gases therefrom, one of said means within one of said pivotable nozzles of said third engine being operable by at least partial failure of one of said two gas turbine propulsion engines and the other of said means within the other of said pivotable nozzles being operable by at least partial failure of the other of said two gas turbine propulsion engines whereby substantially equal thrust is maintained on both sides of the aircraft.

2. A V.S.T.O.L. aircraft as claimed in claim 1 in which said means provided within each of the pivotable nozzles of said third engine comprises valve means for controlling efflux therefrom.

3. A V.S.T.O.L. aircraft as claimed in claim 2 in which each of said valve means comprises a pivotably mounted flap.

4. A V.S.T.O.L. aircraft as claimed in claim 1 in which said pivotable nozzle for each of said two engines is provided with a pressure sensor for monitoring the pressure of that nozzle of said two gas turbine propulsion engines and controlling said means within one of said pivotable nozzles of said third engine.

5. A V.S.T.O.L. aircraft as claimed in claim 4 in which said pressure sensor for said pivotable nozzle of each of said two gas turbine propulsion engines controls said means within said one of said nozzles of said third engine so that the efflux of said third engine is only directed through the nozzle of said third engine on the same side of the aircraft as the at least partially failed engine of said two propulsion engines.

* * * * *